United States Patent [19]
Roberts

[11] 3,707,741
[45] Jan. 2, 1973

[54] WINDSHIELD WIPER
[75] Inventor: Harry W. Roberts, Merrick, N.Y.
[73] Assignee: Pylon Manufacturing Corporation
[22] Filed: April 5, 1971
[21] Appl. No.: 131,091

[52] U.S. Cl.............................................15/250.42
[51] Int. Cl...............................................B60s 1/02
[58] Field of Search.....................15/250.36, 250.42

[56] References Cited

UNITED STATES PATENTS

| 2,983,945 | 5/1961 | De Pew | 15/250.42 |
| 3,083,394 | 4/1963 | Scinta | 15/250.42 X |
| 3,153,254 | 10/1964 | Lenz et al. | 15/250.42 |
| 3,626,544 | 12/1971 | Lopez et al. | 15/250.42 |

Primary Examiner—Peter Feldman
Attorney—Molinare, Allegretti, Newitt & Witcoff

[57] ABSTRACT

A universal windshield wiper having a supporting superstructure detachably supporting a subassembly comprised of a blade, a backing strip and a latching clip detachably retaining the blade and backing strip. The latching clip is provided with two legs, each having a contoured exterior with a single shoulder and the shoulders are offset one from the other so as to engage opposite sides of opposed parts of the supporting superstructure.

7 Claims, 8 Drawing Figures

PATENTED JAN 2 1973
3,707,741
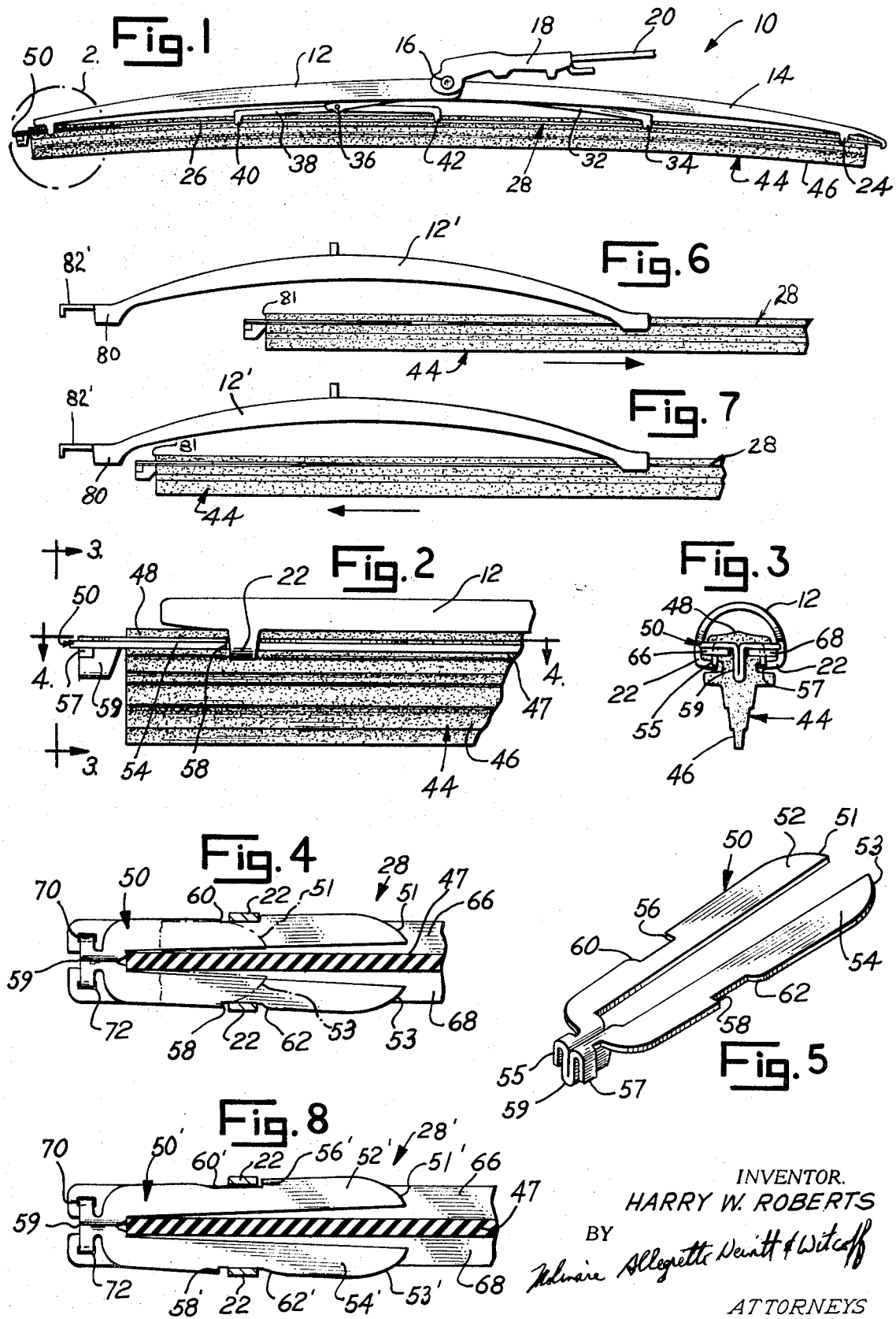
INVENTOR.
HARRY W. ROBERTS
BY
Holmine Allegretti Newitt & Witcoff
ATTORNEYS

WINDSHIELD WIPER

BACKGROUND OF THE INVENTION

The present invention pertains to an improved wiper for cleaning the windshield of a vehicle, for example, an automobile, and more particularly, to an improved windshield wiper incorporating a blade element that is easily retained and readily replaceable in the supporting superstructure which is mounted by novel latching means.

A prior art windshield wiper of the type to which the present invention may pertain is shown in the Lenz et al. U.S. Pat. No. 3,153,254. The Lenz et al. patent shows a windshield wiper blade assembly including a blade, a flexible backing strip for mounting the blade, and a separate latch element, these components being connected as a subassembly for insertion into the supporting superstructure of a windshield wiper. The latch element is comprised of a pair of spring biased legs, each having a notch with a pair of opposed shoulders which is adapted to receive a claw of the supporting superstructure therebetween. The latch element firmly engages with the backing strip to retain the blade, and the notches in the latch element firmly engage the claws of the supporting superstructure for retaining the subassembly in desired position.

In use, it has been found that the claws will sometimes stick and not be removed from shoulders of the associated notches unless the legs of the latch element are materially depressed or pushed one toward the other. Removal of the latching element can be somewhat difficult and cumbersome, particularly in very cold weather, or when corroded or rusted, since the parts to be squeezed together are difficult to handle and require an excessive amount of finger pressure.

The superstructure or arm shown in Lenz et al. U.S. Pat. No. 3,153,254 is but one type used commercially. Another type of superstructure is exemplified in Krohm U.S. Pat. No. 3,195,162. The blade subassemblies shown in the patents are not interchangeable in the separate arm structures.

An object of the present invention is to provide a windshield wiper with an improved means for latching the wiper blade in place in the wiper, such latching means permitting ready installation and removal of the wiper blade from the windshield wiper.

Another object of the present invention is to provide an improved windshield wiper employing a novel latching clip having a pair of legs with an exterior contoured surface having but a single shoulder on each leg, the shoulders on opposed legs being spaced so as to retain the latching clip in engagement with associated claws of a supporting superstructure, while at the same time permitting quick insertion and release of the latching clip from the claws so as to facilitate removal of the blade, backing strip and latching clip subassembly from the windshield wiper.

A further object of this invention is to provide an improved blade subassembly that is interchangeable with the basic arms or superstructures of windshield wipers used commercially at this time.

Other objects and advantages of the present invention will be made more apparent hereinafter.

DESCRIPTION OF THE DRAWING

This invention will be more fully understood when the following description is read in conjunction with the accompanying drawings, wherein like numerals in the different views relate to like elements and wherein:

FIG. 1 is a side elevational view of a windshield wiper incorporating principles of the present invention;

FIG. 2 is an enlarged detail side elevational view at an end of the windshield wiper as indicated by the numeral 2 in FIG. 1;

FIG. 3 is an end view of the windshield wiper taken generally along line 3—3 of FIG. 2;

FIG. 4 is a cross-sectional view of the windshield wiper taken generally along the line 4—4 of FIG. 2;

FIG. 5 is a perspective view of a latching clip of the present invention as shown in FIGS. 1–4;

FIG. 6 is a detail elevational view of a different type of superstructure with which the improved blade subassembly of this invention can be used, illustrating the method of affixing the blade subassembly to a lever of the superstructure;

FIG. 7 is a detail elevational view of the windshield wiper of FIG. 6, illustrating the components just prior to final assembly; and FIG. 8 is a cross-sectional view of the windshield wiper similar to FIG. 4, illustrating a modified form of latching clip.

DETAILED DESCRIPTION OF THE PRESENT INVENTION

Referring to FIG. 1, there is illustrated a windshield wiper 10 having levers 12 and 14 pivotally mounted on a pin or rivet 16 which also mounts a clip 18 to which a wiper arm 20 may be detachably connected. A spring (not shown) encircles the intermediate portion of the pin 16 and bears downwardly on the separate levers 12 and 14 so as to urge the ends of the levers 12, 14 toward a windshield. The outer ends of the levers 12 and 14 are formed into pairs of claws 22 and 24, which slidably engage opposite sides of the backing strip 26. A lever 32, also pivotally mounted on the pin or rivet 16, has one end thereof formed into a pair of claws 34, which also slidably engage opposite sides of the backing strip 26.

The other end of the lever 32 is formed into a claw-like portion 36 which pivotally supports the pressure equalizer 38, the opposite ends of which are formed into claws 40 and 42, respectively, for cooperatively engaging the backing strip 26.

A wiper subassembly 28 is comprised of wiper blade 44, backing strip 26 and latching clip or latch element 50. The wiper blade 44 consists of a wiping lip 46 and a retaining head or bead 48 connected by a reduced connecting portion 47. The connecting portion 47 is adapted to be retained within the longitudinally extending opening or slot in the backing strip 26.

A feature of the present invention is the construction of the latch element 50 that not only releasably retains the wiper subassembly 28 in the arm pressure distributing structure or supporting superstructure, but also retains the elements of the subassembly 28.

With reference to FIGS. 2, 3, 4 and 5, there is illustrated in more detail the construction of the latch element 50. The latch element or latch clip 50 is comprised of a pair of legs 52 and 54 resiliently retained at an end and biased apart by the generally U-shaped connecting portion 59. Each leg 52, 54 is provided with a contoured exterior surface which at the end thereof opposite the connecting portion 59 defines a tapered cam surface 51, 53. The cam surfaces 51, 53 cooperate with claws 22 to facilitate entry of the latch clip 50 between the pair of spaced apart cooperating claws 22. The exterior surface of each leg 52, 54 of the latch clip 50 is contoured so as to provide a single shoulder 56, 58 adapted to engage on opposite sides of the respective claws 22. The shoulder 56 is spaced further from the connecting portion 59 than the shoulder 58 and the two shoulders are adapted to be disposed on opposite sides of the respective cooperating claws 22. Each leg of the latch clip 50 includes on the exterior surface a cam portion 60, 62 as shown in FIG. 5, for example. The cam portion 62 is adapted to be cammed against the claw 22 to facilitate removal of the latch clip 50 from the claws 22.

It is noted that the connecting member 59 is provided with inverted members or projections 55 and 57 which are adapted to engage within openings 70, 72 provided in the support ribs or parallel rails 66, 68 of the backing strip 26. Engagement of the depending projections 55, 57 in the openings 70, 72 of the support ribs 66, 68 functions to retain the backing strip 26 in engagement against the connecting web 47 of the wiper blade 44, thereby retaining the three main components of the subassembly in operative relationship. The rails 66, 68 define a longitudinal slot within which the connecting web 47 of the blade 44 is received.

In assembly of subassembly 28, the latching clip 50 is inserted between the retaining head 48 of blade 46 and the backing strip 26. The connecting portion 59 is raised enough to set the legs or projections 55, 57 on the backing strip 26. Further sliding motion of the latching clip relative to the backing strip 26 and blade 46 retained therein will cause the legs 55, 57 to enter slots 70, 72, whereupon the resilience of the rubber of the retaining head of the blade snaps the legs into the slots 70, 72 and holds the latching clip securely to the backing strip.

To secure a subassembly 28 in place on the supporting superstructure, the backing strip 26 is engaged with the claws 22 and the subassembly is thrust forwardly until the backing strip engages each of the claws 24, 34, 42, 36 and 40. Latching clip 50 passes through the space between claws 22 until claws 22 are disposed between shoulders 56 and 58 respectively.

Turning to FIG. 4, there is shown in dotted line the position of latching clip 50 as it first engages the claws 22. The forward cam surfaces 51, 53 of the legs 52, 54 of latching clip 50 engage the claws 22. When this occurs, the legs 52, 54 are moved toward one another against the bias provided by the U-shaped connecting member 59. Upon further movement of the wiper blade to the right, as viewed in FIG. 4, the upper claw 22 will pass over the shoulder 56 and the opposite or lower claw 22 will engage the shoulder 58. At this point, the inward pressure has been released from the legs 52, 54 of latching clip 50 and the claws 22 are disposed between the offset shoulders 56, 58. The subassembly is thereby retained within the claws 22 of the superstructure.

To remove a wiper subassembly for replacement thereof or of the blade alone, it is necessary to press on the two legs and as soon as the shoulder 56 is cleared from its associated claw 22, the opposite claw 22 will slide off the cam surface 62, biasing the two legs 52, 54 together so as to permit release of the latching clip and thus enable withdrawal of the wiper blade subassembly from the superstructure. The cam surface 62 assists in releasing the latching clip 50 from the superstructure.

In FIGS. 6 and 7 there is illustrated a different form of superstructure with which the improved blade subassembly 28 of this invention can be used. The superstructure may be of the type shown in Krohm U.S. Pat. No. 3,195,162. In this construction, the subassembly 28 is inserted into the claws 82 all the way until the left end as viewed in FIGS. 6 and 7 is past the claws 80. This is illustrated in FIG. 6. It will be understood that the portion of the blade assembly not shown will be engaged with claws of the superstructure not shown. Then the blade assembly 28 is moved to the left as viewed in FIG. 7. The latching clip 50 will pass between the claws 80 and the claws will be retained between offset shoulders 56, 58. It will be noted that the outer stop 82' will abut the left end corner of the wiper blade 46, indicated by the numeral 81 to restrain further movement of the blade assembly relative to the superstructure.

In FIG. 8, there is shown a modified latching clip 50'. The construction of latching clip 50' is like that of latching clip 50, except that the cam portions 60', 62' adjacent the shoulders 56', 58' in each leg 52', 54' are more smoothly blended with the exterior surface. Accordingly, the elements of latching clip 50' corresponding to elements of latching clip 50 are primed. It is understood that the cam portion 62' will cooperate with a claw of a lever of the supporting superstructure after release of shoulder 56' from the opposed claw 22 to facilitate release of the subassembly 28' from the superstructure. The shoulders 56' and 58' are transversely offset one from the other and are spaced apart a distance at least as great as the width of claw 22, and preferably somewhat greater than such width. The modified latching clip can be readily employed with the superstructure shown in FIG. 1 or that shown in FIG. 6.

There has been provided by the present invention an improved windshield wiper including an arm pressure distributing structure having at least one pair of blade-straddling claws, a blade of rubber-like material having a wiper portion and a back portion, a backing strip for engaging in the recess between the wiper portion-back portion to support the blade, and novel latching means interlocking coupling the backing strip to the claws. In addition, as noted above, the latching clip secures the backing strip operatively to the resilient blade made from rubber or the like material. The novel means include a pair of legs resiliently mounted one relative to the other. Each leg of the latching means has a contoured exterior surface including a single shoulder and a cam portion. The shoulder on one leg is spaced from the end of the latching means a distance greater than the shoulder on the other leg, the spacing being at least equal to the width of the straddling claws, such that said one shoulder is adapted to abut the end facing side of the first straddling claw and the other shoulder is adapted to abut the opposite side of the opposed second straddling claw. By virtue of this operative offset of the shoulders and the position of the cam portions adjacent the shoulders, the legs can be moved relative to one another so as to release the one shoulder from engagement with the first straddling claw; the opposite side of the second straddling claw will engage the other shoulder to cam the legs together and thereby assist in easy removal of the blade, backing strip and latching means from the arm pressure distributing structure or supporting superstructure.

The improved device of this invention can be universally mounted in either of the two principal superstructures employed commercially at this time.

While there has been shown and described preferred embodiments of the invention, various modifications will become apparent to those skilled in the art. Therefore, it is not desired to limit the invention to this disclosure and various modifications and equivalents may be resorted to as fall within the spirit and scope of the invention as claimed.

What is claimed is:

1. In a windshield wiper including an arm pressure distributing structure having at least one pair of blade-straddling claws, a blade of rubber-like material having a wiper portion and a back portion, a surface conforming backing strip provided with a longitudinal slot-like opening and formed by a pair of substantially parallel side rails, said back portion of said blade being mountable in said slot-like opening of said backing strip, and latching means interlockingly coupling the backing strip to the claws, said latching means including a pair of legs resiliently mounted one relative to the other, the improvement wherein each leg has a contoured exterior surface including a single shoulder and a cam portion, the shoulder on one leg being spaced from the end of the latching means a distance greater than the shoulder on the other leg, one shoulder being adapted to abut the end facing side of a first straddling claw and the other shoulder being adapted to abut the opposite facing side of the opposed second straddling claw whereby the legs can be moved relative to one another to release said one shoulder from engagement with said first straddling claw and permit removal of the blade, backing strip, and latching means from the arm pressure distributing structure.

2. A windshield wiper as in claim 1 wherein the legs are resiliently connected by a generally U-shaped connecting portion.

3. A windshield wiper as in claim 2 wherein the connecting portion has two projections formed thereon adjacent the end, said projection being adapted to engage in cooperating openings in the backing rail to detachably connect the latching means to the backing strip.

4. A windshield wiper as in claim 1 wherein the contoured exterior surface on each leg defines a cam surface adjacent the end opposite the connected ends, said can surfaces engaging the claws to move the legs inwardly and permit movement of the blade relative to the arm pressure distributing structure until the end facing side of said first claw engages said one shoulder, the legs then being biased outwardly to retain the blade fixed relative to the arm pressure distributing structure.

5. A windshield wiper as in claim 4 wherein removal of the blade is facilitated by manually squeezing the legs inwardly to free the said other shoulder from engagement with its associated claw and sliding the blade, backing strip and latching means subassembly from the arm pressure distributing structure, said one shoulder being the sole means restraining removal of the blade, backing strip and latching means subassembly from the pressure distributing structure.

6. A windshield wiper as in claim 1 wherein the latching means includes a connecting portion joining the pair of legs, said blade having a reduced neck portion connecting the back portion and wiper portion, said reduced neck portion being received in said slot-like opening between said rails, said latching means being disposed between said back portion of the blade and said rails to retain the blade and backing strip in assembled relationship.

7. A windshield wiper as in claim 6 wherein the connecting portion includes projections and said rails have openings adjacent an end, the projections on said connecting portion being adapted to engage in said openings in said rails, the resiliency of said back portion of said blade biasing the latching means to retain the projections in the openings in the rails.

* * * * *